United States Patent
Gusikhin et al.

(10) Patent No.: US 9,587,954 B2
(45) Date of Patent: Mar. 7, 2017

(54) SYSTEM AND METHOD FOR VEHICLE ROUTING USING STOCHASTIC OPTIMIZATION

(71) Applicant: FORD GLOBAL TECHNOLOGIES, LLC, Dearborn, MI (US)

(72) Inventors: Oleg Yurievitch Gusikhin, West Bloomfield, MI (US); Erica Klampfl, Canton, MI (US); Ryan Abraham McGee, Ann Arbor, MI (US); Daniel Reich, Royal Oak, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 13/938,787

(22) Filed: Jul. 10, 2013

(65) Prior Publication Data
US 2015/0019132 A1    Jan. 15, 2015

(51) Int. Cl.
*G01C 21/34* (2006.01)
*G06Q 10/06* (2012.01)

(52) U.S. Cl.
CPC ... *G01C 21/3469* (2013.01); *G06Q 10/06311* (2013.01)

(58) Field of Classification Search
USPC ....... 705/7.12; 701/123, 400, 408, 409, 410, 701/414, 423, 424, 532, 533
See application file for complete search history.

(56) References Cited

U.S. PATENT DOCUMENTS

| | | | | |
|---|---|---|---|---|
| 8,290,701 B2 * | 10/2012 | Mason | ............... | G01C 21/3469 701/422 |
| 2008/0021628 A1 * | 1/2008 | Tryon | ...................... | B60K 6/46 701/99 |
| 2009/0187291 A1 * | 7/2009 | Daum | ..................... | B61L 3/006 701/2 |
| 2011/0035137 A1 * | 2/2011 | Konishi | ............. | F02N 11/0818 701/115 |
| 2011/0060517 A1 * | 3/2011 | Kono | ................. | G01C 21/3469 701/123 |
| 2011/0166731 A1 * | 7/2011 | Kristinsson | ........... | B60W 10/08 701/22 |

(Continued)

FOREIGN PATENT DOCUMENTS

WO    2011035427 A1    3/2011

*Primary Examiner* — Thomas Tarcza
*Assistant Examiner* — Richard Goldman
(74) *Attorney, Agent, or Firm* — Jennifer Stec; Brooks Kushman P.C.

(57) ABSTRACT

A vehicle system enabling a processor to calculate the most efficient route to a destination based on estimated energy usage, vehicle data, and other inputs until the final destination is reached. The vehicle system may receive location related data that may include the current vehicle location and one or more destination points. The vehicle system may receive one or more energy usage affecting parameters from a vehicle related system. The system may calculate a most efficient route based on the location related data and the one or more energy usage affecting parameters and present the most efficient route to a device. The vehicle system may repeat the steps of receiving, calculating, presenting until a destination is reached.

15 Claims, 7 Drawing Sheets

(56) References Cited

U.S. PATENT DOCUMENTS

| | | | | |
|---|---|---|---|---|
| 2011/0270486 A1* | 11/2011 | Stevens | .................. | G06Q 10/04 |
| | | | | 701/31.4 |
| 2011/0309926 A1* | 12/2011 | Eikelenberg | ....... | G01C 21/3469 |
| | | | | 340/439 |
| 2011/0313647 A1* | 12/2011 | Koebler | .............. | B60L 15/2045 |
| | | | | 701/123 |
| 2012/0158299 A1* | 6/2012 | Cerecke | ............. | G01C 21/3446 |
| | | | | 701/533 |
| 2012/0179314 A1* | 7/2012 | Gilman | .................. | B60K 35/00 |
| | | | | 701/22 |
| 2013/0018531 A1* | 1/2013 | Kumar | .................... | B61L 3/006 |
| | | | | 701/2 |
| 2013/0046526 A1* | 2/2013 | Yucel | .................. | G01C 21/3469 |
| | | | | 703/8 |
| 2013/0060469 A1* | 3/2013 | Chen | .................. | G01C 21/3469 |
| | | | | 701/527 |
| 2013/0282272 A1* | 10/2013 | Kluge | ................ | G01C 21/3469 |
| | | | | 701/425 |

\* cited by examiner

SYSTEM AND METHOD FOR VEHICLE ROUTING USING STOCHASTIC OPTIMIZATION

TECHNICAL FIELD

The present invention relates to fuel optimization in vehicles by taking into consideration of selecting a robust route based on the stochastic variability.

BACKGROUND

U.S. Pat. No. 8,290,701 generally discloses vehicle management systems and associated processes considering energy consumption when selecting routes for fleet vehicles. Vehicle management systems and associated processes are described that, in certain embodiments, evaluate vehicle energy usage based on factors such as terrain or elevation, vehicle characteristics, driver characteristics, road conditions, traffic, speed limits, stop time, turn information, traffic information, and weather information, and the like. The features described herein may also be implemented for non-fleet vehicles, such as in personal vehicle navigation systems.

U.S. Patent Application 2013/0046526 generally discloses an apparatus and method for optimizing fuel consumption. A physical dynamics model may be used to simulate a vehicle being driven by a driver along a virtual route, possibly under specified weather conditions. A score for the vehicle may be calculated from estimations, based on the simulation, of fuel efficiency, vehicle drivability, and/or time for completing the route. Simulated ("virtual") vehicles may be configured from components through a user interface. Scores for the vehicles may be compared to select an optimum vehicle.

U.S. Patent Application 2011/0060517 generally discloses a car navigation system indicating the energy consumption per unit distance covered following a prescribed test cycle procedure. The test cycle characteristic values independent of the vehicle model for vehicle energy consumption in a specified running condition are calculated, and the vehicle energy consumption parameter of the engine or the motor is estimated from the basic vehicle specifications such as the vehicle weight, the power supply type, the emission test cycle fuel consumption rate, the test cycle characteristic values in the emission test cycle and the vehicle characteristics. Using the basic vehicle specifications and the energy consumption parameter, the energy consumption is predicted taking the landform and traffics into consideration.

SUMMARY

In a first illustrative embodiment, a vehicle system enabling a processor to calculate the most efficient route to a destination based on estimated energy usage, vehicle data, and other inputs until the final destination is reached. The vehicle system may receive location related data that may include the current vehicle location and one or more destination points. The vehicle system may receive one or more energy usage affecting parameters from a vehicle related system. The system may calculate a most efficient route based on the location related data and the one or more energy usage affecting parameters and present the most efficient route to a device. The vehicle system may repeat the steps of receiving, calculating, presenting until a destination is reached.

In a second illustrative embodiment, a machine readable storage medium storing instructions that, when executed, cause a processor to perform a method of communicating with a network system to calculate estimated energy based on a current vehicle location and one or more selected destinations. The method may establish communication with a network system on which a plurality of simulated vehicles may be run. The method may transmit location related data to the network system based on a driving route. The method may receive estimated energy usage related to the location related data from the network system and receive one or more energy usage affecting parameters from a vehicle related system. The method may calculate a predicted energy usage based on the estimated energy usage and the one or more energy usage affecting parameters and display the driving route on a device. The method may repeat the receiving and calculating steps to determine a most effective driving route until it reaches the one or more destination.

In a third illustrative embodiment, a system enabling a server to establish communication with at least one vehicle computing system to calculate and determine one or more energy efficient routes for at least one destination. The system may receive location data including a origin and at least one destination. The system may receive one or more effective energy parameters and estimate energy consumption and time variables based on the one or more effective energy parameters. The system may receive energy consumed data from vehicle computing system and determine whether the estimated energy consumption and time variables are consistent with previously generated traffic simulations. The system may update the estimated energy consumption and time variables.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
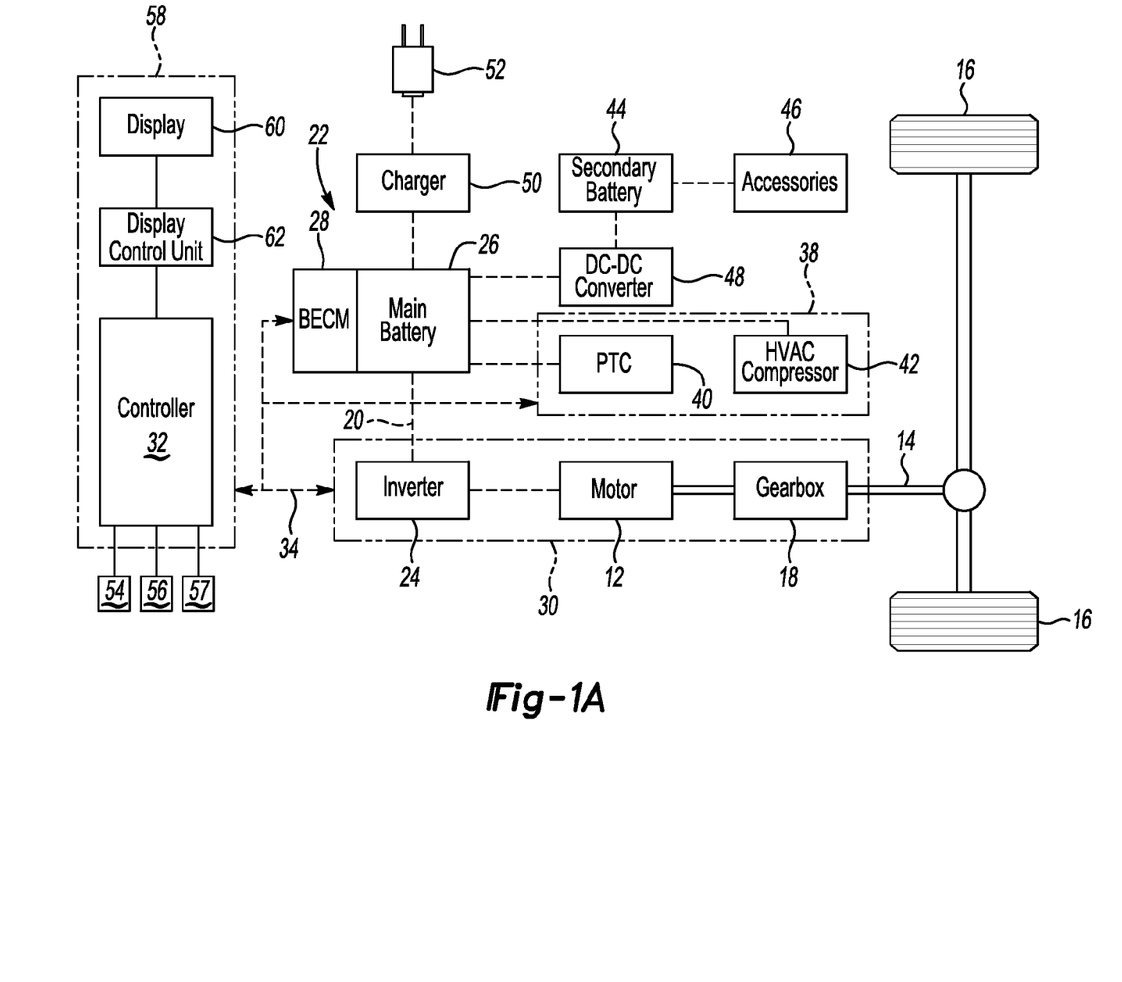
FIG. 1a is a simplified, exemplary schematic representation of a vehicle including an information display system according to one or more embodiments of the present disclosure.

FIG. 1a is a simplified, exemplary schematic representation of a vehicle including an information display system according to one or more embodiments of the present disclosure. Referring now to the drawings, FIG. 1a is a simplified, exemplary schematic representation of a vehicle 10. As seen therein, the vehicle 10 may be a battery electric vehicle (BEV), which is an all-electric vehicle propelled by one or more electric machines without assistance from an internal combustion engine. The one or more electric machines of the vehicle 10 may include a traction motor 12. The motor 12 may output torque to a shaft 14, which may be connected to a first set of vehicle drive wheels, or primary drive wheels 16, through a gearbox 18. Other vehicles within the scope of the present disclosure may have different powertrain arrangements, such as more than one traction motor, tradition internal combustion engine with no electric machine, or a hybrid system. In the embodiment shown in FIG. 1a, the traction motor 12 can be used as a motor to output torque to propel the vehicle 10. Alternatively, the motor 12 can also be used as a generator, outputting electrical power to a high voltage bus 20 and to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a fluid coolant system. The BECM 28 may act as a controller for the main battery 26. The BECM 28 may also include an electronic monitoring system that manages temperature and state of charge of each of the battery cells. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1a, the motor 12, the gearbox 18, and the inverter 24 may generally be referred to as a transmission 30. To control the components of the transmission 30, a vehicle control system, shown generally as a vehicle processor/controller 32, may be provided. Although it is shown as a single controller, it may include multiple controllers that may be used to control multiple vehicle systems. For example, the controller 32 may be a vehicle computing system (VCS) having one or more modules including the powertrain control module (PCM). In this regard, the PCM portion may be software embedded within the VCS, or it can be a separate hardware device.

A controller area network (CAN) 34 may allow the controller 32 to communicate with the transmission 30 and the BECM 28. Just as the main battery 26 includes a BECM, other devices controlled by the controller 32 may have their own controllers or sub-controllers. For example, the transmission 30 may include a transmission control module (TCM) (not shown), configured to coordinate control of specific components within the transmission 30, such as the motor 12 and/or the inverter 24. For instance, the TCM may include a motor controller. The motor controller may monitor, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various processors/controllers can make up a vehicle computing system, which, for reference purposes, may be the controller 32.

Although illustrated and described in the context of the vehicle 10, which is a BEV, it is understood that embodiments of the present disclosure may be implemented on other types of vehicles, such as those powered by an internal combustion engine, either alone or in addition to one or more electric machines (e.g., HEVs, PHEVs, etc.).

The vehicle 10 may also include a climate control system 38. The climate control system 38 may include both heating and cooling components. For instance, the climate control system 38 may include a high voltage positive temperature coefficient (PTC) electric heater 40. The PTC 40 may be used to heat coolant that circulates to a passenger car heater. Heat from the PTC 40 may also be circulated to the main battery 26. The climate control system 38 may also include a high voltage electric HVAC compressor 42. Both the PTC 40 and the HVAC compressor 42 may draw electrical energy directly from the main battery 26. Moreover, the climate control system 38 may communicate with the controller 32. The on/off status of the climate control system 38 can be communicated to the controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various other vehicle accessories 46, such as headlights, and the like. A DC-to-DC converter 48 may be electrically interposed between the main battery 26 and the secondary battery 44. The DC-to-DC converter 48 may allow the main battery 26 to charge the secondary battery 44.

The vehicle 10, which is shown as a BEV, may further include an alternating current (AC) charger 50 for charging the main battery 26 using an off-vehicle AC source. The AC charger 50 may include power electronics used to convert the off-vehicle AC source from an electrical power grid to the DC voltage required by the main battery 26, thereby charging the main battery 26 to its full state of charge. The AC charger 50 may be able to accommodate one or more conventional voltage sources from an off-vehicle electrical grid (e.g., 110 volt, 220 volt, etc.). The AC charger 50 may be connected to the off-vehicle electrical grid using an adaptor, shown schematically in FIG. 1 as a plug 52.

Also shown in FIG. 1a are simplified schematic representations of a braking system 54, an acceleration system 56, and a navigation system 57. The braking system 54 may include such things as a brake pedal, position sensors, pressure sensors, or some combination of the two, as well as a mechanical connection to the vehicle wheels, such as the primary drive wheels 16, to effect friction braking. The braking system 54 may also include a regenerative braking system, wherein braking energy may be captured and stored as electrical energy in the main battery 26. Similarly, the acceleration system 56 may include an accelerator pedal having one or more sensors, which, like the sensors in the braking system 54, may communicate information such as throttle input to the controller 32.

The navigation system 57 may include a global positioning system (GPS) unit and a navigation user interface. The navigation user interface may include a navigation display and a navigation controller and inputs for receiving destination information or other data from a driver. The navigation system 57 may also communicate distance and/or location information associated with the vehicle 10, the vehicle's target destinations, or other relevant GPS waypoints. The controller 32 may communicate with each individual vehicle system to monitor and control vehicle operation according to programmed algorithms and control logic. In this regard, the controller 32 may help manage the different energy sources available and the mechanical power being delivered to the wheels 16 in order to maximize the vehicle's range. The controller 32 may also communicate with a driver as well.

In addition to the foregoing, the vehicle 10 may include an information interface system 58 to facilitate communications with a driver. As explained in detail below, the information interface system 58 may provide relevant vehicle content to a driver of the vehicle 10 before, during or after operation. As shown in FIG. 1a, the information interface system 58 may include the controller 32 and an information display 60. The information interface system 58 may also include its own control system, which, for reference purposes, may be a display control unit 62. The display control unit 62 may communicate with the controller 32 and may perform control functions on the information display 60, although the controller 32 may also function as the information interface system 58.

The controller 32 and/or vehicle computing system may be configured to receive input that relates to current operating conditions of the vehicle 10. For instance, the controller 32 and/or vehicle computing system may receive input signals from the BECM 28, the transmission 30 (e.g., motor 12 and/or inverter 24), the climate control system 38, the braking system 54, the acceleration system 56, or the like. The vehicle computing system and/or controller 32 may provide output to the display control unit 62 such that the information display 60 conveys energy consumption and range information, or other information relating to the operation of the vehicle 10 to a driver.

The information display 60 may be disposed within a dashboard of the vehicle 10, such as an instrument panel or center console area. Moreover, the information display 60 may be part of another display system, such as the navigation system 57, or may be part of a dedicated information display system. The information display 60 may be a liquid crystal display (LCD), a plasma display, an organic light emitting display (OLED), or any other suitable display.

The information display 60 may include a touch screen interface for receiving driver input associated with selected areas of the information display 60. The information interface system 58 may also include one or more buttons, including hard keys or soft keys, located adjacent the information display 60 for effectuating driver input. The information interface system 58 may also include a voice recognition system for receiving voice inputs from the users through various microphones, for example. In addition, the information interface system 58 may include an audio system for relating audio information to the users. Other operator inputs known to one of ordinary skill in the art may also be employed without departing from the scope of the present disclosure.

Figure 1B:
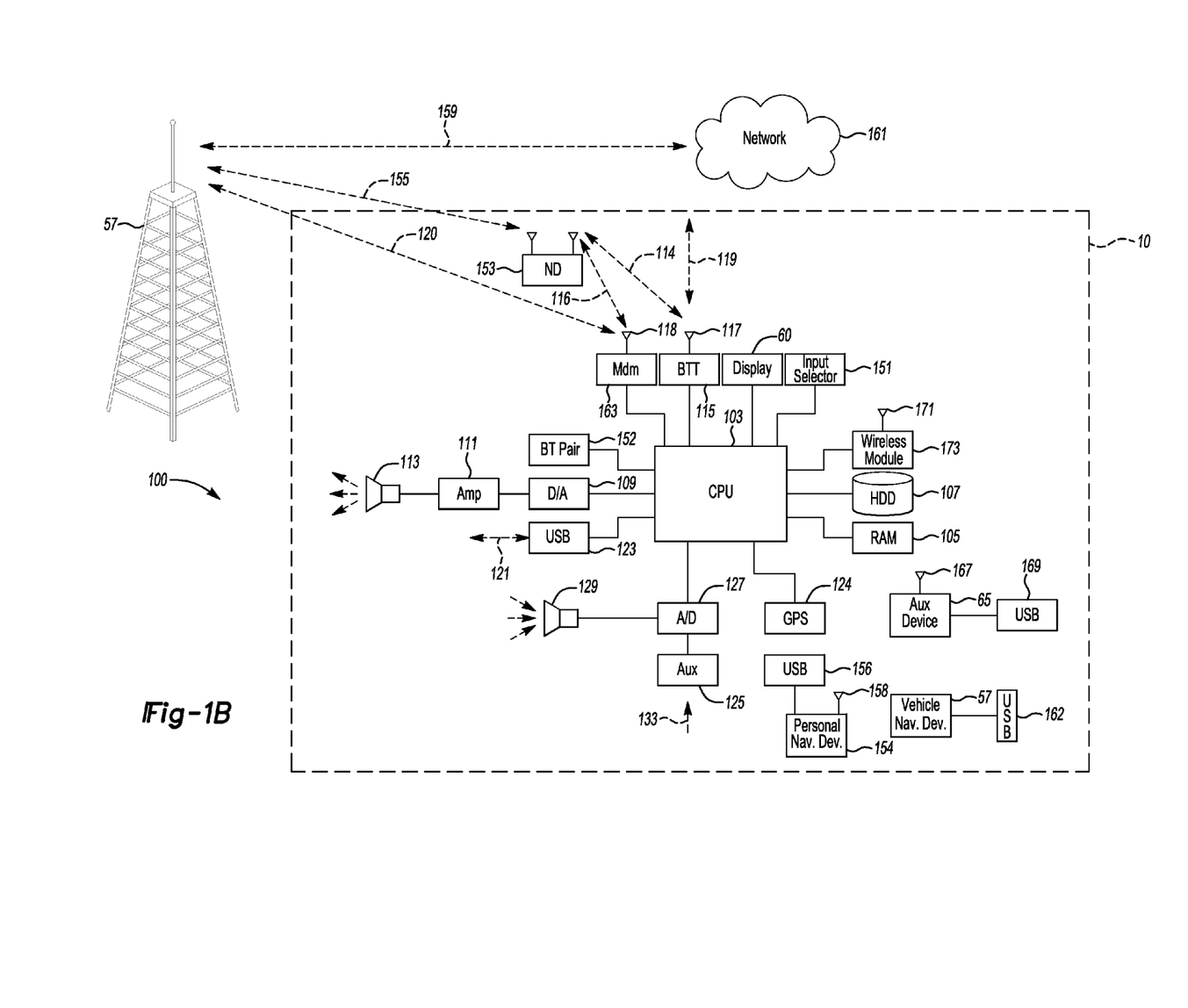
FIG. 1b is an exemplary block topology of a vehicle infotainment system implementing a user-interactive vehicle information display system.

FIG. 1b illustrates an example block topology for a vehicle based computing system 100 (VCS) for a vehicle 10. An example of such a vehicle-based computing system 100 is the SYNC system manufactured by THE FORD MOTOR COMPANY. As stated above, a vehicle enabled with a vehicle-based computing system may contain a visual front end interface 60 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment shown in FIG. 1b, a processor 103 controls at least some portion of the operation of the vehicle-based computing system. Provided within the vehicle, the processor allows onboard processing of commands and routines. Further, the processor is connected to both non-persistent 105 and persistent storage 107. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 129, an auxiliary input 125 (for input 133), a USB input 123, a GPS input 124, screen 60, which may be a touchscreen display, and a BLUETOOTH input 115 are all provided. An input selector 151 is also provided, to allow a user to swap between various inputs. Input to both the microphone and the auxiliary connector is converted from analog to digital by a converter 127 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 60 and a speaker 113 or stereo system output. The speaker is connected to an amplifier 111 and receives its signal from the processor 103 through a digital-to-analog converter 109. Output can also be made to a remote BLUETOOTH device such as personal navigation device (PND) 154 or a USB device such as vehicle navigation device 57 along the bi-directional data streams shown at 119 and 121 respectively.

In one illustrative embodiment, the system 100 uses the BLUETOOTH transceiver 115 to communicate 117 with a user's nomadic device 153 (e.g., cell phone, smart phone, PDA, or any other device having wireless remote network connectivity). The nomadic device can then be used to communicate 159 with a network 161 outside the vehicle 10 through, for example, communication 155 with a cellular tower 157. In some embodiments, tower 157 may be a WiFi access point.

Exemplary communication between the nomadic device and the BLUETOOTH transceiver is represented by signal 114.

Pairing a nomadic device 153 and the BLUETOOTH transceiver 115 can be instructed through a button 152 or similar input. Accordingly, the CPU is instructed that the onboard BLUETOOTH transceiver will be paired with a BLUETOOTH transceiver in a nomadic device.

Data may be communicated between CPU 103 and network 161 utilizing, for example, a data-plan, data over voice, or DTMF tones associated with nomadic device 153.

Alternatively, it may be desirable to include an onboard modem 163 having antenna 118 in order to communicate 116 data between CPU 103 and network 161 over the voice band. The nomadic device 153 can then be used to communicate 159 with a network 161 outside the vehicle 10 through, for example, communication 155 with a cellular tower 157. In some embodiments, the modem 163 may establish communication 120 with the tower 157 for communicating with network 161. As a non-limiting example, modem 163 may be a USB cellular modem and communication 120 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 153 is replaced with a cellular communication device (not shown) that is installed to vehicle 10. In yet another embodiment, the ND 153 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 103. In the case of certain temporary data, for example, the data can be stored on the HDD or other storage media 107 until such time as the data is no longer needed.

Additional sources that may interface with the vehicle include a personal navigation device 154, having, for example, a USB connection 156 and/or an antenna 158, a vehicle navigation device 57 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 165. These devices can be connected through a wireless 167 or wired 169 connection. Auxiliary device 165 may include, but are not limited to, personal media players, wireless health devices, portable computers, and the like.

Also, or alternatively, the CPU could be connected to a vehicle based wireless router 73, using for example a WiFi (IEEE 803.11) 171 transceiver. This could allow the CPU to connect to remote networks in range of the local router 173.

In addition to having an exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as a vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A VCS communicating with a nomadic device using BLUETOOTH may communicate with a cloud based computing system to receive trip data related to a drive route. The VCS may evaluate the trip data and determine route selections based on trip data and additional vehicle parameters. The trip data may be used to determine vehicle energy consumption based on the selected trip and/or current location of the vehicle while generating alternative routes for display to a user that is based on the amount of energy being used and/or may be consumed, the estimated trip time to arrive at the destination, and/or the route that may deliver the best vehicle performance.

A hybrid electric vehicle (HEV) and/or a BEV may have a limited range or distance that can be traveled before the main battery 26 is depleted. Drivers need to know whether the range of the HEV/BEV is sufficient based on the battery capacity. A BEV's VCS may need to know the driver's itinerary or calendar schedule prior to starting the trip to determine an accurate estimate of the battery capacity compared to the trip. If the BEV knows the destination and required arrival time of a given calendar event, or series of events, the BEV may plan a trip to optimize energy consumption as well as minimize travel time to each calendar event while ensuring the driver is able to make it a final location to recharge the main battery 26 within the vehicle's range.

Figure 2:
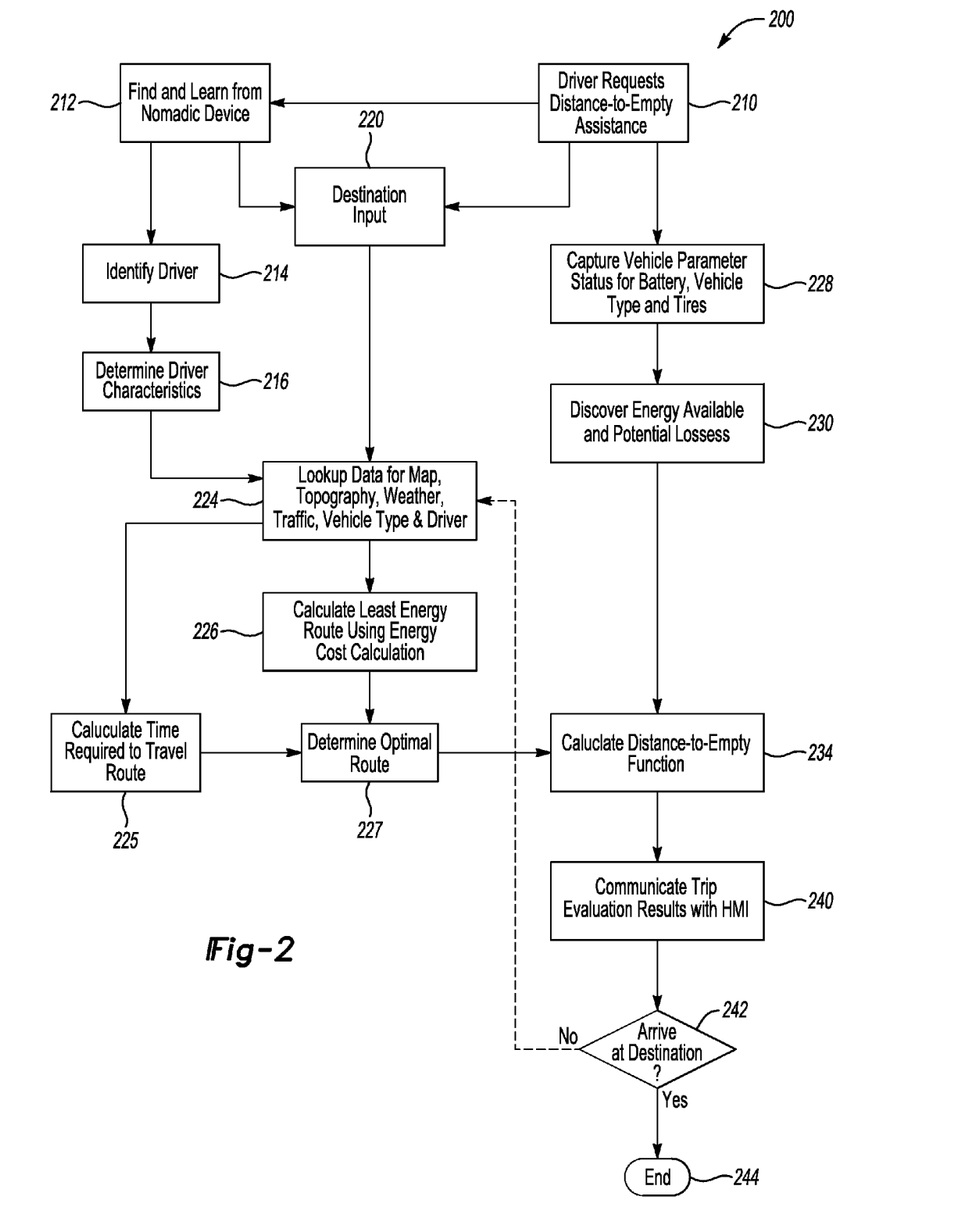
FIG. 2 is a simplified, exemplary flow chart depicting a method according to one or more embodiments of the present disclosure.

Referring to FIG. 2 is a flowchart illustration of a high-level strategy for trip evaluation using trip data obtained from a user interface. BEVs may have a limited range or distance that can be traveled before the main battery 26 is depleted. Drivers need to know whether the range of the BEV is sufficient based on the battery capacity. BEV's need to know the driver's itinerary or calendar schedule prior to starting the trip. If the BEV knows the destination and required arrival time of a given calendar event, or series of events, the BEV may plan a trip to optimize energy consumption as well as minimize travel time to each calendar event while ensuring the driver is able to make it to a final location to recharge the main battery 26 within the vehicle's range. The BEV may also change a route calculation based on a variety of factors that are not currently being considered, allowing constant updating so routes change dynamically based on changing conditions including weather, environmental, and/or traffic.

Accordingly, the range of a vehicle may also be referred to as its distance to empty (DTE) value. The DTE value is calculated based on a variety of factors and algorithms including several different engineering disciplines. Unlike a conventional vehicle and a fuel gauge, the BEV's distance to empty calculation can be drastically affected by traffic, road selection, weather, terrain, or driving style, for example, making it more difficult for a driver to estimate the DTE value.

FIG. 2 illustrates a strategy 200 for evaluating a trip when a driver requests assistance using the DTE calculations, as represented by block 210. The driver request may be implied by one or more control modules and/or processors in the vehicle to automatically receive destination and required arrival-time information based on a calendar event or itinerary stored on a nomadic device 153 in communication with the VCS 100. Similarly, destination and required arrival-time information may be manually input by the user.

In the situation where the driver has an electronic device, the vehicle 10 connects to the driver's nomadic device, as represented by block 212. As stated above, the nomadic device may include, but is not limited to, a mobile phone, smart phone, PDA or any wireless device with network connectivity and having an electronic calendar function. The nomadic device may communicate with the vehicle 10 via a wireless remote network, such as Bluetooth, optical, or any suitable communication network. The nomadic device may also be connected physically to the VCS through a USB connector or physical data port, for example.

By connecting to the nomadic device, the controller 32 can find and learn information about the driver and the driver's itinerary. If the nomadic device includes an electronic calendar, the VCS is able to access the driver's calendar events and itinerary automatically. The VCS may also be able to obtain other information from one or more electronic devices in communication with the system.

Along these lines, the VCS may determine the identity the driver, as represented by block 214. The VCS may determine the driver identity based on the information on the nomadic device. How the vehicle 10 is driven by that recognized driver may be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The VCS and/or controller 32 may take into account past driving behavior, current driving behavior, or predicted future driving behavior.

The driver profile may correspond to a theoretical or global average for all types of drivers. The driver profile may also be an estimated average for the vehicle 10. The vehicle's average profile may correspond to a lifetime average or an average for a past distance traveled, period of time or some other relevant event.

In another embodiment each driver of the vehicle 10 may be assigned a key ID identifying a driver profile to the VCS. This may allow driver preferences, setting or other profile information, such as an average energy consumption profile, to be stored and recalled for each driver. The key ID may be input to the vehicle either actively or passively at startup. For example, each driver may manually enter a code associated with their key ID. Alternatively, the key ID may be automatically transmitted to the VCS using radio frequency (RF) technology. In particular, the key ID may be an RFID stored in a driver's nomadic device, key or key fob that, when interrogated, transmits the driver's ID to the VCS.

Based on the identity of the driver, the VCS may determine the driver's characteristics, as represented by block 216. The VCS may take into account past driving behavior, current driving behavior and store a driver profile to determine how future driving behavior may affect the vehicle's energy consumption or deplete the main battery 26 prior to reaching an intended locations, such as the next calendar event, a charge point, the final destination, or a combination of locations along the itinerary.

The VCS also communicates with the driver and/or a driver's nomadic device to arbitrate the location related data, e.g. intended destination, as represented by block 220. A user interface system and method based on the calendar event stored on the nomadic device may be transmitted to the VCS allowing the system to communicate destination information to the vehicle occupant based on the calendar events. The vehicle occupant may confirm or deny the destination based on the stored calendar events.

In another embodiment, the destination information may be communicated to the VCS using the touch screen display and/or vocal commands received by the system microphone and processed by one or more controllers in communication with the VCS. For example, the vehicle occupant may enter a destination at the touch screen or based on the VCS recognizing the driver, the system may retrieve previously stored destination inputs saved in the system's memory and communicate this information to the driver.

For example, if the driver enters the vehicle and the VCS recognizes his nomadic device, the VCS may retrieve previous destination data stored in memory, on a cloud, or on the driver's nomadic device. The VCS may determine that it is 5:00 PM on a Tuesday, and the driver is at work based on the vehicles current time, date, and GPS location, therefore the VCS may present destination options that the driver may be interested in at this date, time slot, and current GPS location. Based on the date, time, and current GPS location the VCS may present efficient optimal routes to the driver's home, gym, grocery store, and/or kid's school based on previous destination data stored.

As represented by block 224, the VCS may also take into account environmental factors such as weather, traffic, or topography/terrain which indicates changes in elevation, for example. The VCS may wirelessly receive environmental factors from one or more remote servers including, but not limited to, a weather website, traffic website, and/or map website. The VCS uses forecasts of the weather and traffic, as well as knowledge of the topography to estimate how far the remaining charge and/or fuel level will take a vehicle along any specific route to the intended destination. Estimates of the accuracy of these forecasts can also be made using mathematical models of forecast accuracy. The mathematical models may be generated and calculated off-board on a cloud that may be in wireless communication with the VCS. Further, the VCS may be able to receive estimates of the forecast data including, but not limited to, turbulence of wind flows and variability in micro-traffic conditions. The VCS may receive the environmental data from numerous sources such as vehicle-to-vehicle communication networks, stored data, such as topographic map data, telecommunication networks, or broadcast networks to which the vehicle subscribes. Of course, any suitable method for receiving and/or looking up particular environmental data may be utilized.

Once the environment data has been received, the VCS may calculate the time required to travel one or more routes to the destination as represented by block 225. The fastest arrival time required to travel to the destination may be calculated based on a formula or algorithm that takes into account numerous traffic factors in addition to the environmental data received. The fastest arrival time may not be the least energy route, however may allow the driver an option to arrive at the destination faster if needed.

Based on the environmental data, the controller can calculate the least energy route, as represented by block 226. The least energy route may be calculated based on an energy-cost formula or algorithm that takes into account the numerous environmental factors that may affect that amount of energy required along a particular route. The least energy route calculation may also be based on one or more traffic variables including, but not limited to, traffic flow, traffic light durations, number of lanes on the road, and/or road pavement types.

The VCS may also capture the status of vehicle parameters that may affect the DTE, as represented by block 228. Vehicle parameters such as the state of charge of the battery 26 or tire pressure and friction, vehicle weight, for example can be provided. The VCS may also obtain the battery performance characteristics and active charging or discharge rate or other relevant information regarding the vehicle. The vehicle parameters can be provided to the VCS through a vehicle network, or the vehicle information may be stored in a remote location such as on a remote server and be provided to the VCS.

Based on the vehicle parameters, the remote server and/or VCS may determine the available energy as well as potential losses, as represented by block 230. Available energy includes the stored energy in the battery and/or the fuel in the tank. Potential losses may include frictional losses associated with tire pressure, or energy losses from running accessories such as air conditioning.

After the least energy route has been calculated by block 226 using vehicle routing problem solutions with the energy cost function based on topography/terrain, weather, traffic, vehicle type and driver characteristics, the system may determine a most efficient and/or optimal route for the driver in block 227 by also taking into consideration the calculated times required to travel the one or more routes calculated in block 225. The determined optimal route may be used by the system to calculate the DTE function, as represented by block 234. The DTE calculation uses all the data and variables collected by the remote server and/or VCS to determine if the route completion based on the driver's itinerary and/or destination inputs is likely or not. For example, the DTE function uses destination and arrival-time information automatically extracted from the user's calendar and/or from the drivers input. The DTE function may also acquire necessary vehicle status information and all drive information along with driver profile information to obtain the low energy route while considering travel time. The DTE program can also process the battery model and/or fuel model based on retrieved parameters.

Finally, the remote server may communicate to the VCS, and/or the VCS reports to the user the trip evaluation results, as represented by block 240. The controller communicates the trip evaluation results to the driver via the information interface system 58. The trip evaluation results may include the preferred detailed route. The trip results may also include necessary estimations of power available during and at the end of the itinerary.

The system may continuously monitor changes in the trip and determine whether a detoured has taken place, as represented by block 242. If the vehicle has not arrived at its destination, the system may continuously lookup data for map, topography, weather, and/or traffic to ensure an optimal route to the destination is selected. For example, if the driver makes an impulse decision to stop at a local retail store in the area to do some shopping, the VCS may continuously lookup, calculate, and determine an optimal route to the selected destination once the driver enters the vehicle and continues his trip. In another example, an accident may occur in an upcoming route during the trip to a destination causing traffic in an area that was originally determined to be a part of the optimal route to the selected destination. The system may continuously monitor environmental and traffic factors to update, calculate, and determine the optimal route while in transit to the destination. The system may end the evaluation of a trip once the driver has arrived at their destination as represented by block 244.

Figure 3:
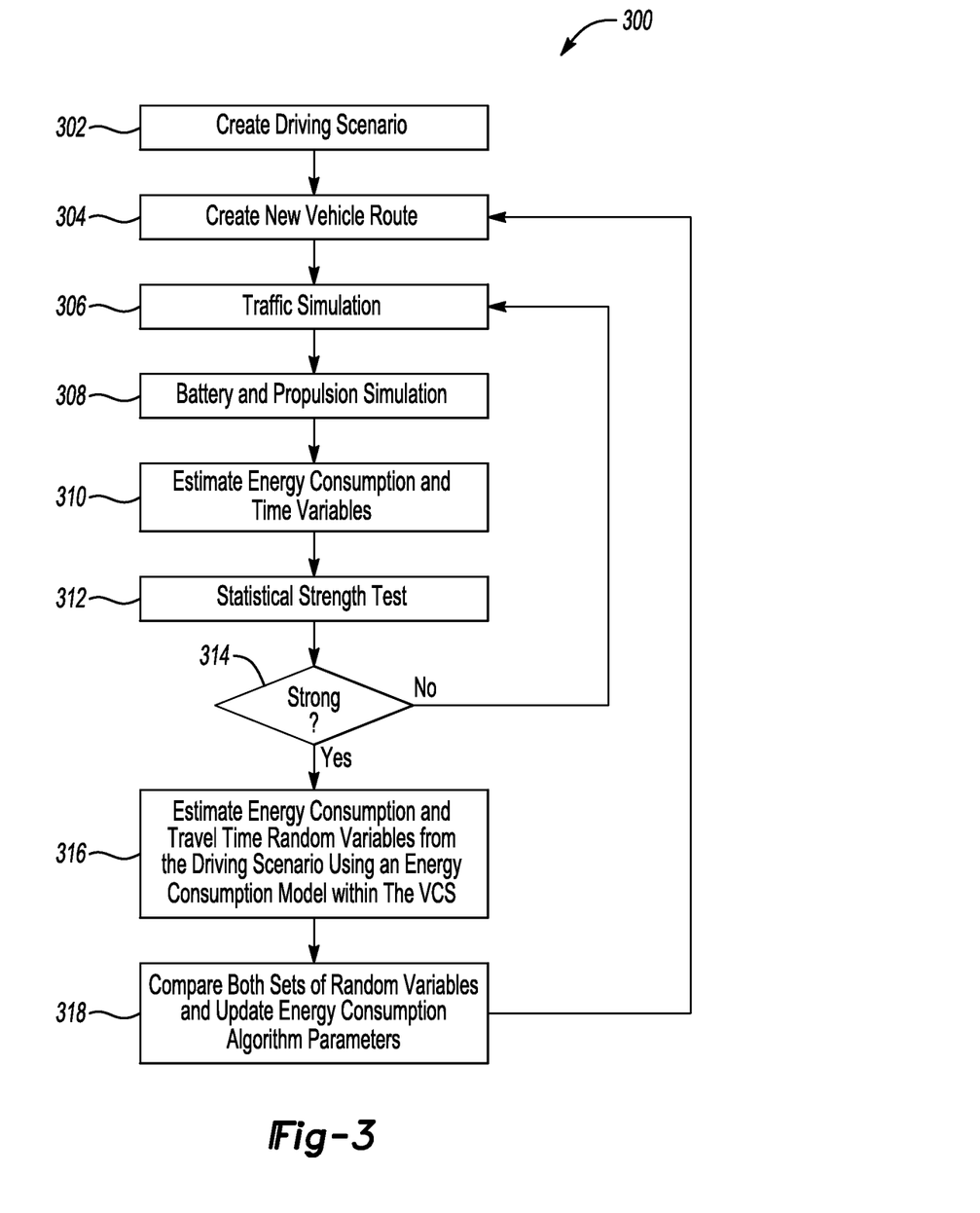
FIG. 3 is a flow chart illustrating an example method of an energy consumption determination process to generate one or more routes.

FIG. 3 is a flow chart illustrating an example method of an energy consumption determination process 300 to generate one or more simulations for routes. The energy consumption determination process 300 results may be used to estimate and predict energy consumption and time it takes to complete a route. The energy determination process results may be stored and continuously examined as a tool to train an energy consumption model used to assist a driver of a vehicle. The energy consumption model may be in a vehicle, located at a remote server, and/or being stored on a cloud.

At step 302, the energy consumption determination process may begin with a user creating a driving scenario. The driving scenario may include one or more drive cycles. The drive cycles are computed for different driving scenarios to determine the most significant influencers and sensitivity of features of the driving scenario. For example, the driving scenario may include, but is not limited to, the use of cruise control and vehicle accessories, road type, weather, wind, and/or aggressive driving. The driving scenario may be able to receive additional variable information from one or more networks including, but not limited to, a weather website, and/or map website.

At step 304, once the driving scenario is complete, the energy consumption determination process may create a new vehicle route. The vehicle route may include location related data, such as an entered starting point and one or more destinations. The vehicle route may also include, but is not limited to, one or more stops along a route to a destination. For example, the vehicle route may include a home address as a starting point and several destinations including a grocery store, dry cleaners, and the post office before returning home.

At step 306, the energy consumption determination process may calculate the most efficient route by using traffic congestion as an influence on the predicted amount of energy being used in a certain driving scenario and/or vehicle route selected. The traffic simulation may include, but is not limited to, the influence of signal lights and stop signs, number of lanes in the road(s) that are generated based on the selected route and the number of vehicles on the route. The traffic simulation may communicate with a traffic website to receive additional variables including, but not limited to, construction, detour, and/or accident information. For example, the traffic simulation may provide additional input variables that may impact the predicted energy consumption being generated by the energy consumption determination process.

At step 308, the energy consumption determination process may begin the battery and propulsion simulation to determine how efficient the powertrain system may operate to meet the vehicle specific load including, but not limited to, the driving scenario, vehicle route, and traffic simulation. For example, the battery and propulsion simulation may determine the performance of the hybrid powertrain system including the impact and feedback from one or more vehicle subsystems, e.g. battery cooling system, during the simulation.

At step 310, once the battery and propulsion simulation is complete, the process may estimate energy consumption based on the vehicle route. The process may also estimate one or more time variables including, but not limited to, the time it may take to arrive to the one or more destinations, time remaining before charging the battery, and/or time it may take to return home or to another charging station.

At step 312, the process may determine if the estimated energy consumption and time variables are statistically accurate based on one or more previous simulations that calculated the given route. In one embodiment, the process may apply the Student's t-test which is a statistical hypothesis test that may be used to determine if the data sets are significantly different from each other at step 314. For example, the process may run the driving scenario with a selected route through the traffic and battery propulsion simulation several times to determine if the data sets are significantly different and identified as not being a strong data set. To improve the accuracy of the estimated and predicted values, the process may continue to run the simulation. If the process determines that the data sets are consistent and running another simulation may not provide any additional data, the process may identify the statistical data sets as strong.

At step 316, once the process has determined that the statistical data sets are strong enough with consistent results, the estimated energy consumption and time variables may be transmitted to a VCS for further analysis using an energy consumption and time prediction control algorithm. The energy consumption and time prediction control model/algorithm may be running on a processor and/or one or more control modules in communication with the VCS. The energy consumption and time prediction control algorithm may receive additional vehicle inputs to ensure a robust prediction of energy consumption and time of arrival for the selected route. The energy consumption and time prediction model may be running on the one or more control modules located in a vehicle or at a remote location in communication with the VCS. The remote locations may include a server and/or in a cloud computing environment. In one embodiment, the one or more control modules running the energy consumption and time prediction model may receive additional vehicle data including, but not limited to, specific environment conditions at the vehicle, the vehicle coefficient of drag, tire pressure, air density, and/or elevation data.

At step 318, the process may compare the adjusted predicted energy consumption and travel time variables based on the received additional vehicle parameters to the estimated energy consumption and related time variables. The additional vehicle parameters are discussed further in FIG. 4. The process may compare the simulation and the actual vehicle energy consumption and transmit this data to the simulation process to improve the energy consumption and travel time predictions. The continuous feedback of actual energy consumption and travel time data being transmitted to the simulation process may improve the energy consumption predictions.

Figure 4:
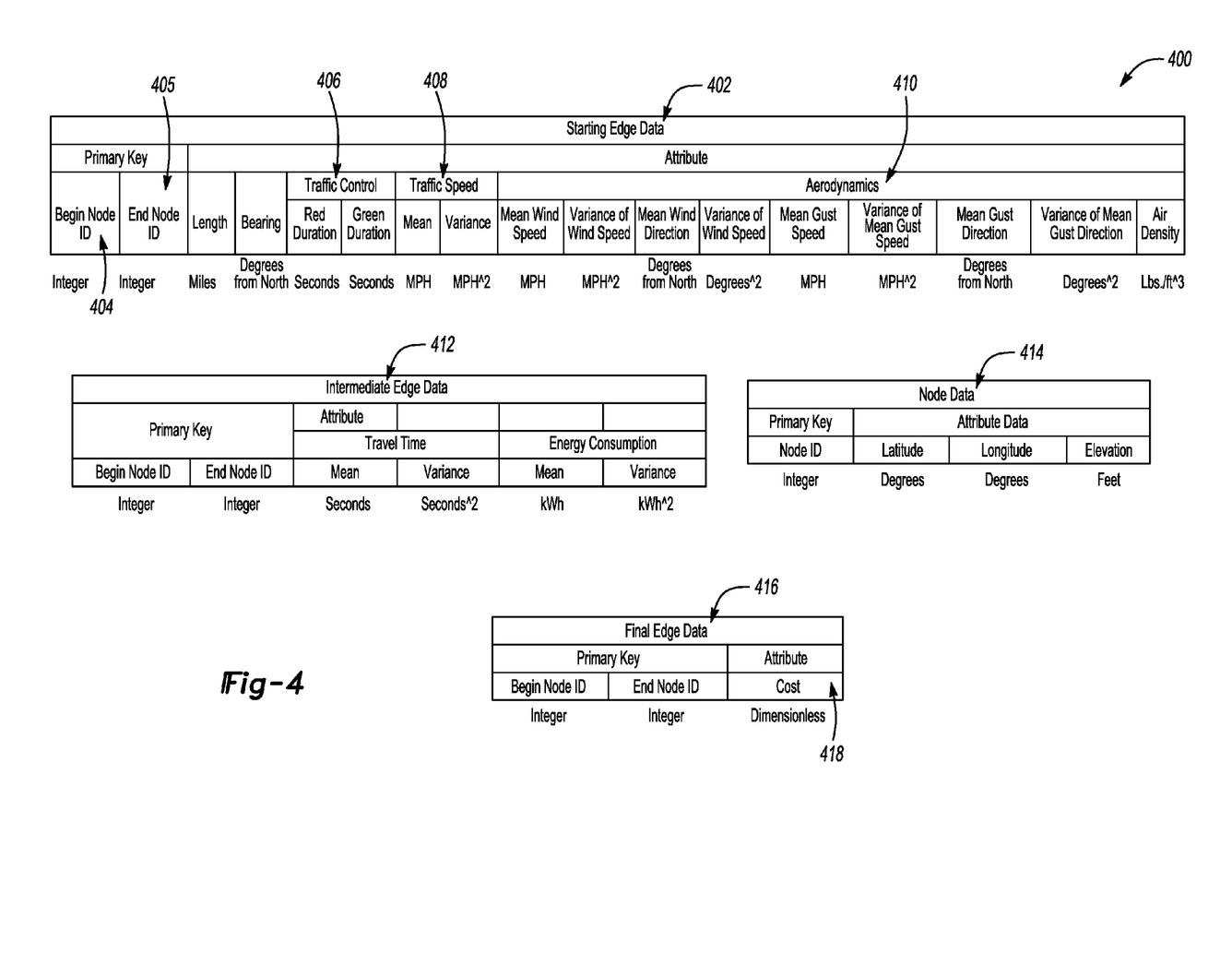
FIG. 4 is an illustrative example of datasets generated and/or stored in memory for use in the energy consumption determination process.

FIG. 4 is an illustrative example of data sets 400 generated and/or stored in memory for use in the energy consumption determination process. The data sets may be stored on a remote computer/server and made available to the VCS using wireless communication technology including, but not limited to, BLUETOOTH, Wifi, and/or cellular telecommunication.

The data sets show in FIG. 4 is an example of the actual vehicle parameters used to improve the estimated energy consumption and travel time prediction. For example, the starting edge data 402 may include, but is not limited to, the begin node ID (starting of trip) 404 and the end node ID (destination) 405. The edge data may also include traffic control 406, traffic speed 408, and aerodynamic variables 410. The aerodynamic variables may include, but is not limited to, mean wind speed, variance of wind speed, mean wind direction, mean gust speed, variance of mean gust speed, mean gust direction, and/or air density.

The data set may also include additional intermediate edge data 412. The intermediate edge data may include, but is not limited to, variables that may be analyzed based on a stretch of road that may be taken into consideration when determining estimated energy and travel time for a route. The intermediate edge data includes, but is not limited to, recorded travel time and energy consumption for that edge, e.g. that stretch of road in the route. The data set may also have additional node data 414 including, but not limited to, latitude, longitude, and/or elevation.

The data set may be used as additional inputs to the estimated energy consumption and travel time simulation process for further analysis being done at the energy consumption and time prediction model. The further analysis may include, but is not limited to, the final edge data 416 which calculates the actual cost 418 of the energy used on the route.

Figure 5:
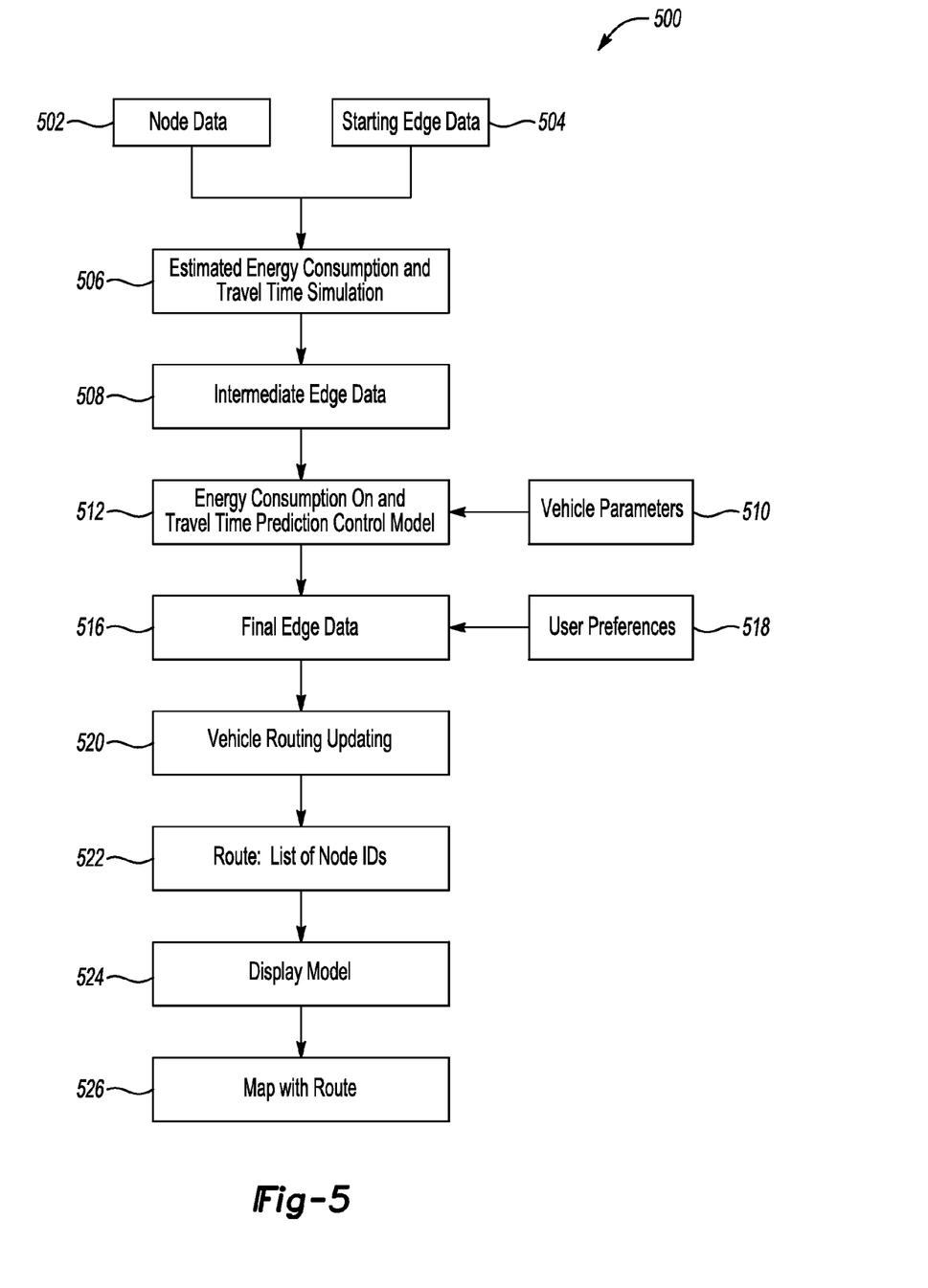
FIG. 5 is a flow chart illustrating an example method of an energy consumption route determination process including user preferences and/or input.

FIG. 5 is a flow chart illustrating an example system of a vehicle route determination process 500 including user preferences and/or input. The route determination process includes estimated simulation data and actual vehicle parameters to predict energy consumption and travel time based on an entered destination. The vehicle route determination system may continuously update during an en route trip to ensure an accurate prediction based on detours or unexpected deviations in the trip to the entered destination.

At step 502, the node data is entered by a vehicle occupant selecting location related data such as the one or more destinations may be included during the requested vehicle trip. The node data may include, but is not limited to the beginning location (e.g. current vehicle location) and/or at least one destination entered into the energy consumption and travel time system. The system may begin to receive starting edge data to understand the current vehicle location by using an in-vehicle GPS and/or a nomadic device in communication with the VCS at step 504. The starting edge data may be calculated based on one or more sensors or signals in communication with the VCS, the estimated energy consumption and travel time simulator, and/or the one or more control modules running the energy consumption and travel time prediction model/algorithm.

At step 506, the node data and starting edge data may be transmitted to the estimated energy consumption and travel time simulation administrator. The estimated energy consumption and travel time simulation process is done based on the received data as explained in FIG. 3. The transmission of the node data and starting edge data to the estimated energy consumption and travel time simulation administrator may be done using wireless technology including, but not limited to WiFi, Bluetooth, and/or cellular communication. The wireless technology may be embedded in the vehicle, and/or use Bluetooth technology to communicate the received occupant input from the VCS and transmit it to the simulation administrator using a nomadic device.

Once the estimated energy consumption and travel time simulation has received the data from the vehicle, the administrator may generate and transmit an intermediate edge data to the vehicle at step 508. The intermediate edge data may be transmitted to the vehicle using wireless technology. The VCS may receive the intermediate edge data generated by the estimated energy consumption and travel time simulation administrator using wireless technology including, but not limited to, WiFi, Bluetooth, and/or cellular communication. The VCS may mange and transmit the received intermediate edge data to the one or more modules to determine a most efficient rout by calculating the energy consumption and travel time prediction model/algorithm at step 512.

At step 510, the energy consumption and travel time prediction algorithm may receive one or more vehicle parameters to better predict energy consumption and time variables for the edge data being processed. Based on the received intermediate edge data from the estimated energy consumption and travel time simulation, and the vehicle parameters, the one or more control modules may calculate a final edge data at step 516. The final edge data may include a more robust calculation of energy consumption and travel time prediction of a hybrid or pure electric powertrain system.

At step 518, the vehicle occupant, e.g. user of the system, may input preferences that may adjust the final edge data. For example, the user may prefer to take a different road to stop at her favorite coffee shop for a cup of coffee therefore causing the system to update the vehicle routing, therefore changing the final edge data at step 520.

In one embodiment, the final edge data may change during the trip based on a traffic detour, therefore the vehicle routing may be updated using a list of known node IDs that are alternative routes for the selected destination at step 522. The VCS may display the model by using one or more types of visual and audio arrangements including, but not limited to turn by turn directions at step 524. The VCS may also present a map with edge data, the route, energy consumption, and/or travel time on a visual display at step 526.

Figure 6:
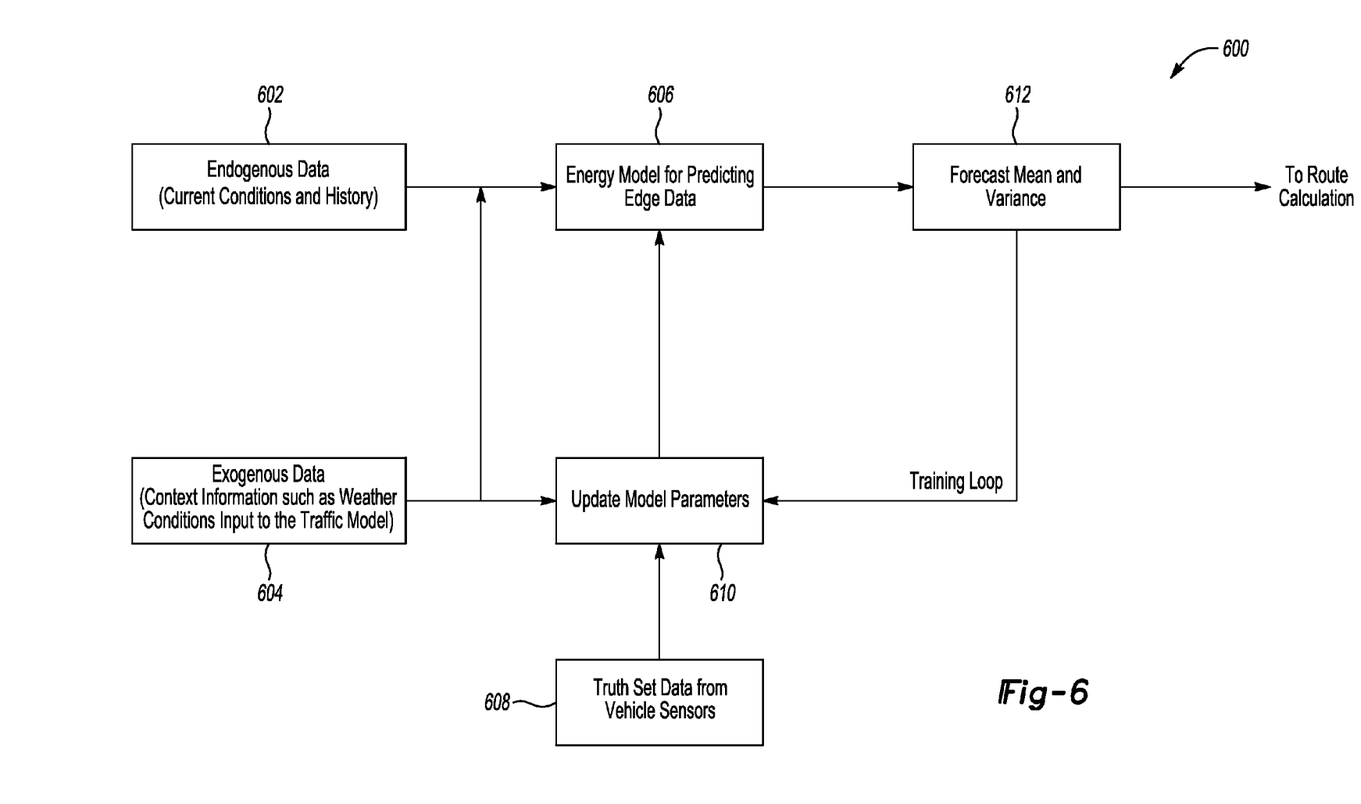
FIG. 6 is a flow chart illustrating an example method of forecasting route calculation based on exogenous and/or endogenous driving data.

FIG. 6 is a flow chart illustrating an example method of forecasting route calculation 600 based on exogenous and/or endogenous driving data. The forecasting route calculation enables the energy prediction model to continuously improve while the vehicle is driving by collecting real world data. The forecasting of a starting edge and/or edge data for use in energy and travel time prediction may be estimated using simulation processes, however one of the embodiments disclosed herein ensures a more robust predictive energy consumption model.

At step 602, endogenous data including, but not limited to, vehicle system parameters (e.g. current battery temperature), traffic history for the edge data generated for the selected route, and/or driver behavior (e.g. aggressive driver). The energy model may also receive exogenous data including, but not limited to, weather conditions, traffic model and estimated energy consumption from the simulation administer, and/or traffic control and speed.

At step 606, the energy model for predicting edge data may receive the one or more endogenous and exogenous data when predicting energy consumption and travel time for an edge. Based on the received data, the energy model may predict a forecast mean and variance for energy consumption and travel time for the edge data and/or the selected route at step 612.

The forecasting route calculation has a feedback loop where the energy model parameters are continuously updated using exogenous data and/or other vehicle sensors and signal calculations at step 610. The other vehicle sensors and signal calculations include, but are not limited to, vehicle aerodynamic variables, tire pressure, and/or battery cooling system data. The updated energy model parameters are sent to the energy model for continuously predicting a more improved energy consumption and travel time result.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a processor configured to:
receive location-related data;
receive energy usage affecting parameters, including previously recorded energy usage amount along potential route segments, from a vehicle-related system;
calculate a most energy efficient route, including projected energy usage along possible routes based on the location-related data and the usage affecting parameters;
present the most efficient route on a device; and
repeat the steps of receiving, calculating, and presenting until the destination is reached.

2. The vehicle system of claim 1, wherein the device includes a liquid crystal display screen.

3. The vehicle system of claim 1, wherein the device includes a mobile phone.

4. The vehicle system of claim 1, wherein the location-related data includes current vehicle location and one or more destinations.

5. The vehicle system of claim 1, wherein the vehicle-related system includes vehicle sensors.

6. The vehicle system of claim 1, wherein the vehicle-related system includes a controller area network bus.

7. The vehicle of claim 1, wherein the energy usage affecting parameters include traffic data.

8. A non-transitory machine readable storage medium storing instructions that, when executed, cause a processor to perform a method comprising:
- receiving location-related data;
- receiving energy usage affecting parameters, including previously recorded energy usage amount along potential route segments, from a vehicle-related system;
- calculating a most energy efficient route, including projecting energy usage along possible routes based on the location-related data and the energy usage affecting parameters; presenting the most efficient route on a device; and
- repeating the steps of receiving, calculating, and presenting until the destination is reached.

9. The non-transitory machine readable storage medium of claim 8, wherein the location-related data includes current vehicle location and one or more destinations.

10. The non-transitory machine readable storage medium of claim 8, wherein the vehicle-related system includes vehicle sensors.

11. The non-transitory machine readable storage medium of claim 8, wherein the energy usage affecting parameters include traffic data.

12. A method comprising:
- receiving location-related data;
- receiving energy usage affecting parameters, including previously recorded energy usage amount along potential route segments, from a vehicle-related system;
- calculating a most energy efficient route, including projecting energy usage along possible routes based on the location-related data and the energy usage affecting parameters; presenting the most efficient route on a device; and
- repeating the steps of receiving, calculating, and presenting until the destination is reached.

13. The method of claim 12, wherein location-related data is an origin and one or more destinations.

14. The method of claim 12, wherein the method further comprises establishing communication with one or more vehicle computing systems using wireless technology.

15. The method of claim 12, wherein the energy usage affecting parameters include traffic control, traffic speed, and/or aerodynamic variables.

* * * * *